United States Patent
Hakeem et al.

(10) Patent No.: US 9,938,953 B2
(45) Date of Patent: Apr. 10, 2018

(54) METHOD AND SYSTEM FOR ENGINE CONTROL

(71) Applicant: Ford Global Technologies, LLC, Dearborn, MI (US)

(72) Inventors: Mohannad Abdullah Hakeem, Dearborn, MI (US); Gopichandra Surnilla, West Bloomfield, MI (US); Todd Anthony Rumpsa, Saline, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 14/742,479

(22) Filed: Jun. 17, 2015

(65) Prior Publication Data

US 2016/0369762 A1    Dec. 22, 2016

(51) Int. Cl.
| | |
|---|---|
| *F02D 19/06* | (2006.01) |
| *F02D 19/08* | (2006.01) |
| *F02P 5/04* | (2006.01) |
| *F02D 41/24* | (2006.01) |
| *F02P 5/15* | (2006.01) |
| *F02P 5/152* | (2006.01) |
| *F02D 41/00* | (2006.01) |
| *F02D 35/02* | (2006.01) |

(52) U.S. Cl.
CPC .......... *F02P 5/045* (2013.01); *F02D 19/0649* (2013.01); *F02D 41/0025* (2013.01); *F02D 41/2451* (2013.01); *F02P 5/1502* (2013.01); *F02P 5/152* (2013.01); *F02D 35/027* (2013.01); *F02D 2200/0418* (2013.01); *F02D 2200/0611* (2013.01); *Y02T 10/46* (2013.01)

(58) Field of Classification Search
CPC .. F02D 19/081; F02D 19/064; F02D 19/0655; F02D 19/085; F02D 19/087; F02D 35/027; F02D 37/02; F02D 2200/0418; F02D 2200/3005; F02D 2200/2406; F02D 2200/26; F02D 41/0025; F02D 2041/1472; F02P 5/152; F02P 5/15; F02P 5/04; F02P 5/1527; F02P 5/045; F02M 26/47
USPC ............... 123/406.29, 406.3, 406.32, 406.33
See application file for complete search history.

(56) References Cited

U.S. PATENT DOCUMENTS

| | | | | |
|---|---|---|---|---|
| 5,000,149 | A * | 3/1991 | Miyama | F02P 5/1527 123/406.33 |
| 5,233,962 | A * | 8/1993 | Fodale | F02P 5/1527 123/406.3 |
| 5,267,164 | A * | 11/1993 | Miyama | F02P 5/152 123/406.33 |
| 5,845,620 | A * | 12/1998 | Miyashita | F02P 5/1527 123/406.3 |
| 6,062,204 | A | 5/2000 | Cullen | |
| 7,363,911 | B2 | 4/2008 | Brehob | |
| 8,527,188 | B2 | 9/2013 | Sasaki | |

(Continued)

*Primary Examiner* — Lindsay Low
*Assistant Examiner* — George Jin
(74) *Attorney, Agent, or Firm* — Julia Voutyras; McCoy Russell LLP

(57) ABSTRACT

Methods and systems are provided for improving engine spark and torque control. In one example, adaptive spark control of an engine may include a modifier that adjusts the inferred fuel octane estimate and a spark adaptation based on ambient humidity. The method allows the speed-load dependent variation in octane effect of humidity to be reduced.

19 Claims, 4 Drawing Sheets

(56) References Cited

U.S. PATENT DOCUMENTS

| | | |
|---|---|---|
| 8,763,594 B2 | 7/2014 | Surnilla et al. |
| 2002/0185107 A1 | 12/2002 | Kubesh et al. |
| 2004/0159309 A1* | 8/2004 | Nagaishi ............... F02D 35/026 |
| | | 123/406.34 |
| 2004/0182364 A1* | 9/2004 | Meek .................... F02P 5/1521 |
| | | 123/406.29 |
| 2006/0118085 A1 | 6/2006 | Oda et al. |
| 2006/0137654 A1* | 6/2006 | Mizushima ........... F02D 35/027 |
| | | 123/406.33 |
| 2007/0119391 A1* | 5/2007 | Fried ....................... F02B 47/02 |
| | | 123/25 A |
| 2010/0319444 A1* | 12/2010 | Miyaura ............... F02D 35/026 |
| | | 73/114.49 |
| 2011/0174267 A1* | 7/2011 | Surnilla ................ F02D 35/027 |
| | | 123/406.29 |
| 2011/0303187 A1* | 12/2011 | Sasaki .................... F02P 5/152 |
| | | 123/406.3 |
| 2012/0290195 A1* | 11/2012 | Irie ..................... F02D 13/0238 |
| | | 701/104 |

* cited by examiner

METHOD AND SYSTEM FOR ENGINE CONTROL

FIELD

The present description relates generally to methods and systems for controlling a vehicle engine, including ignition spark timing, based on an inferred octane value.

BACKGROUND SUMMARY

Internal combustion engines may include an exhaust gas recirculation (EGR) system to recirculate a controlled portion of exhaust as generated by the engine into an intake manifold of the engine. The recirculation of exhaust gas provides various benefits including a reduction in exhaust $NO_x$ emissions and improved fuel economy. However, the dilution provided by the EGR results in a change in the inferred octane of the fuel injected into the engine. Ambient humidity also results in a dilution effect by affecting the charge cooling ability of the intake aircharge, in addition to displacing the oxygen in the air and hence reducing its concentration. Specifically, humidity reduces the knock tendency the engine by lowering the temperature of the end gases in the combustion chamber.

Various engine control approaches have been developed to account for the change in inferred octane of a fuel based on the presence of EGR and/or humidity. One example approach is shown by Cullen et al. in U.S. Pat. No. 6,062,204. Therein, spark timing is determined as a function of engine speed-load and then corrected with a factor that is based on the dilution effect of EGR and/or humidity on borderline spark.

However, the inventors herein have recognized a potential issue with such an approach. The octane effect of EGR and humidity varies with engine speed-load conditions. The inferred octane strategy of Cullen determines the octane of the fuel based on the fuel type and independent of the engine speed-load. As a result, the octane effect of EGR and humidity may cause an error in the calculation of the inferred octane. For example, in the presence of EGR or high humidity, the inferred octane may be over-estimated (e.g., the apparent octane effect of the EGR/dilution may be interpreted as a real fuel octane addition by the inferred octane algorithm). Spark adjustments based on the incorrect inferred octane may result in degraded fuel economy and as well as unexpected knock. Specifically, under high humidity conditions and in the absence of humidity compensation, an engine controller may not have accurate knowledge of the ambient humidity level and hence may perform a knock adaptation that over-protects against knock. As such, this may affect overall engine performance.

In one example, the issues described above may be addressed by a method for controlling an engine comprising: selecting an initial spark timing based on engine operating parameters including estimated fuel octane; learning a spark timing adjustment based on feedback indication of knock; correcting the spark timing adjustment based on the engine operating parameters; updating the initial spark timing based on the corrected spark timing adjustment; and updating the estimated fuel octane based on the updated spark timing.

The technical effect of adjusting a spark control adaptation with a modification based on ambient humidity is that a more reliable inferred fuel octane estimate may be achieved, and the speed-load effect of humidity on fuel octane can be reduced. By improving the accuracy of a fuel octane estimate, borderline spark settings may be better set, and spark timing may be provided without significant loss in torque. Hence, the convergence of the octane number estimation is faster, more robust, and independent of speed load fluctuations.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
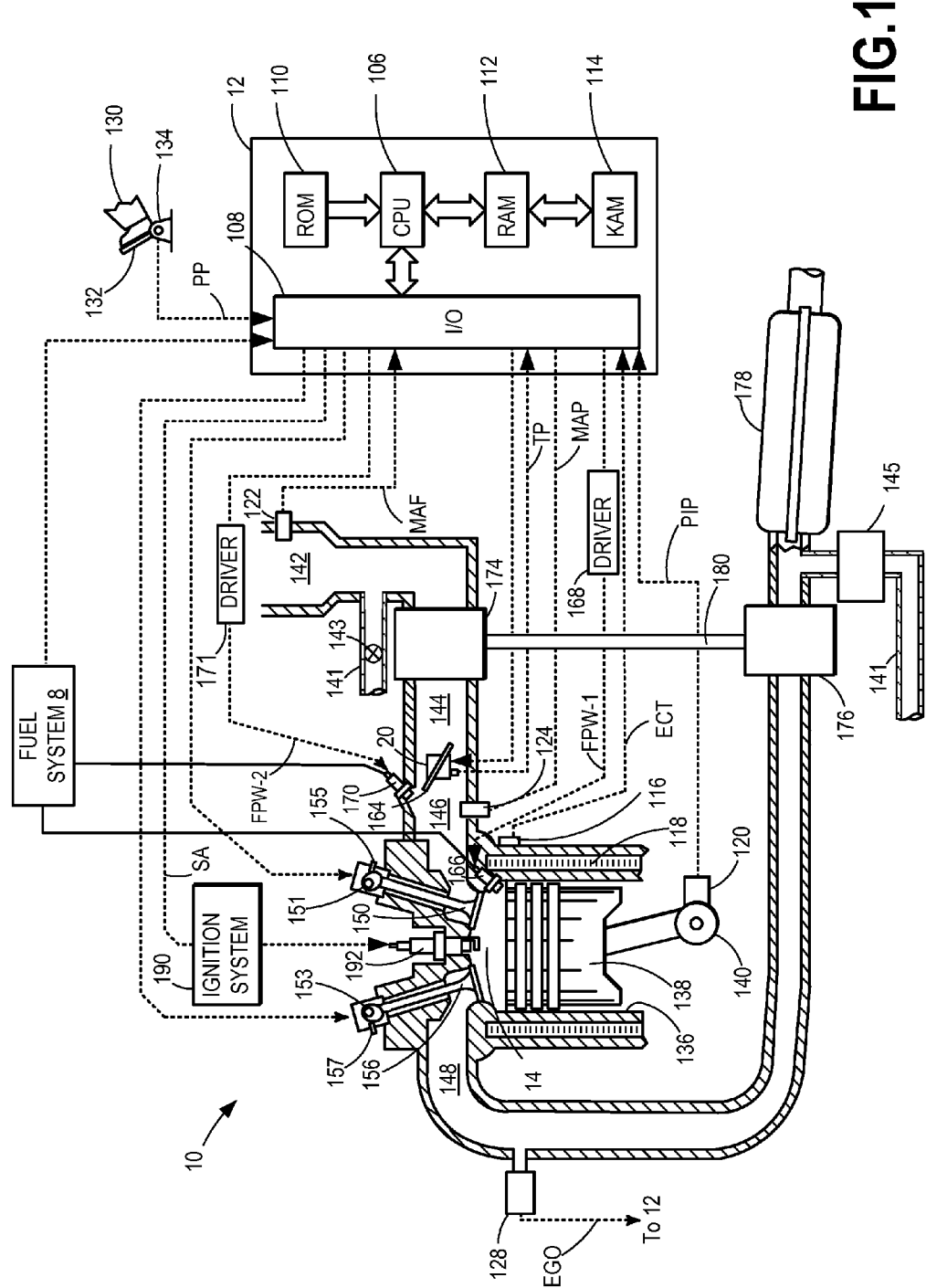
FIG. 1 shows an example engine system.
Figure 3:
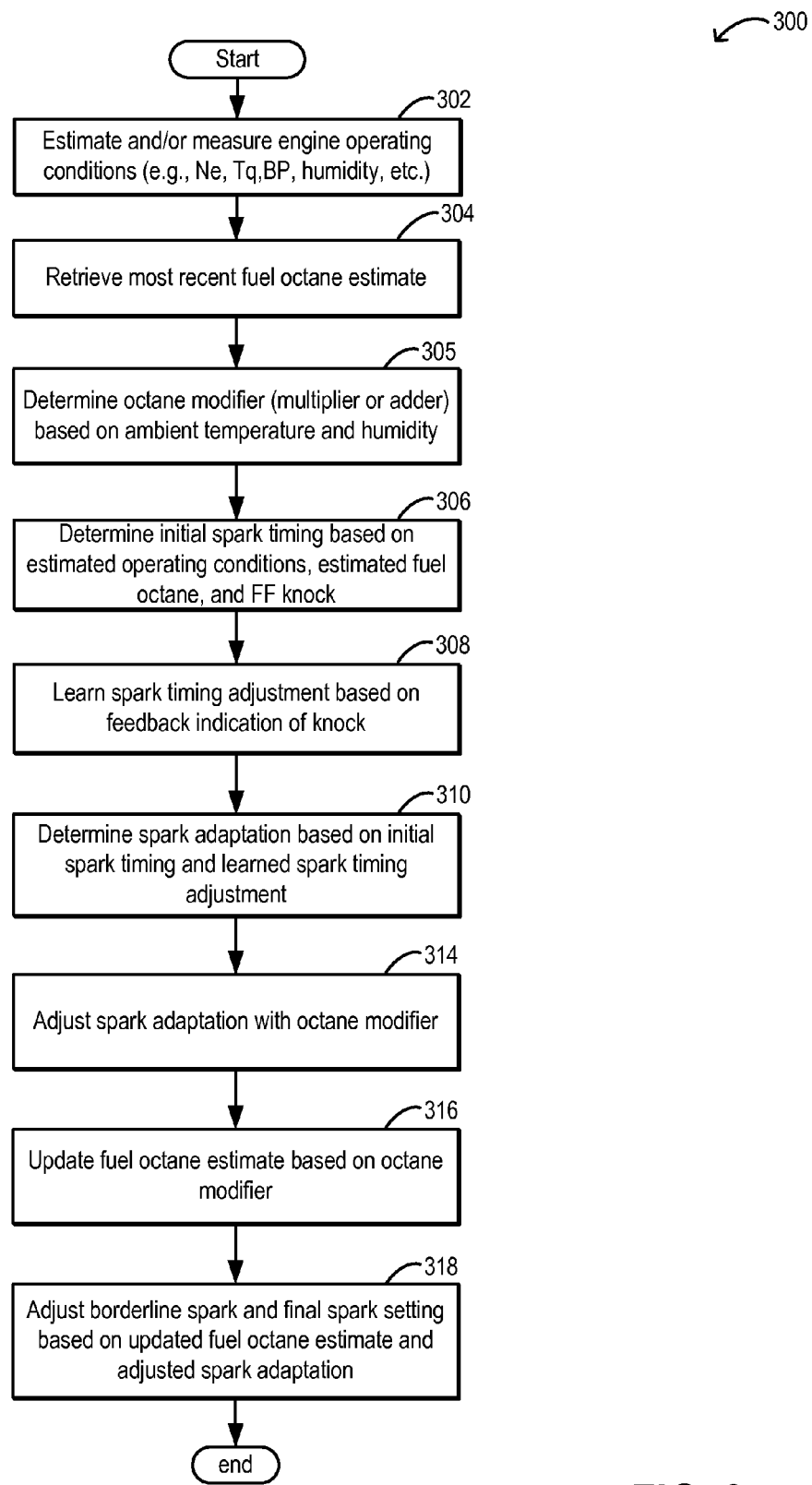
FIG. 3 shows an example flow chart of a method for adaptive spark control based on a modified fuel octane estimate.
Figure 4:
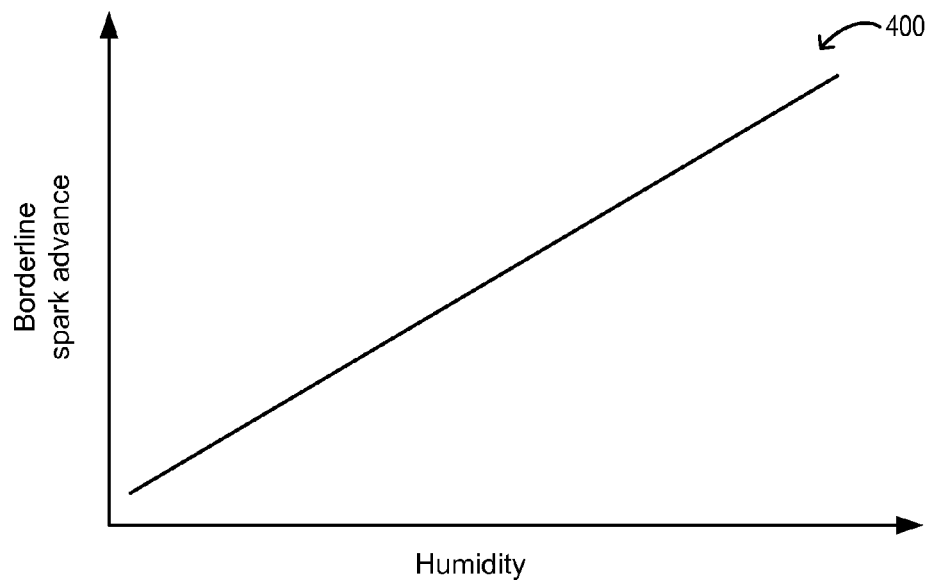
FIG. 4 shows a graph depicting an example relationship between spark timing at a given engine operating condition in the presence or absence of fuel octane modification.
Figure 5:
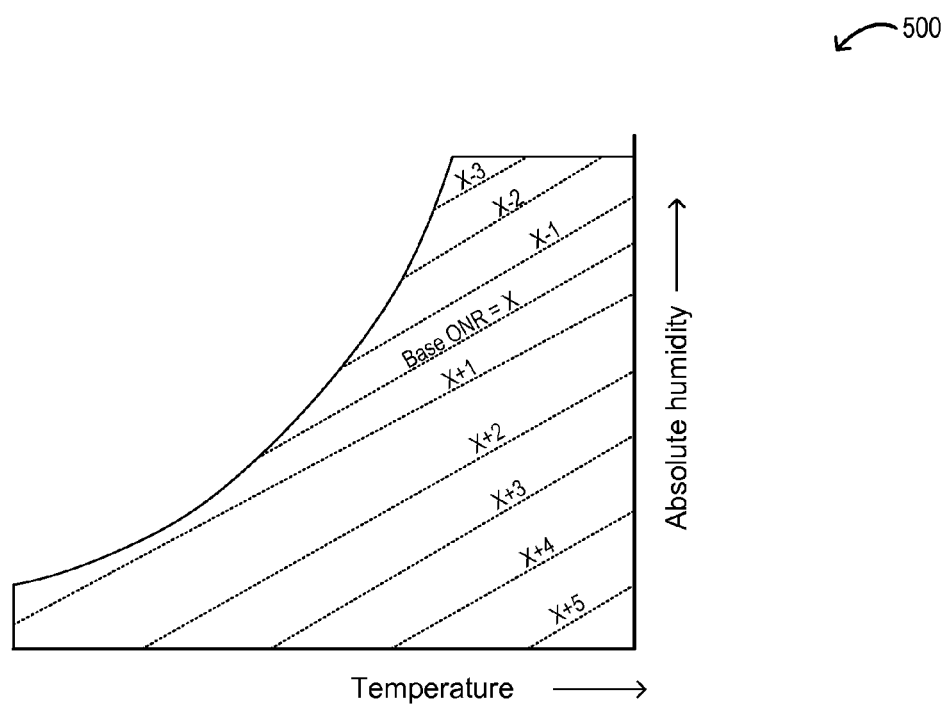
FIG. 5 shows a graph depicting an example relationship between spark timing adjustments and ambient humidity, according to the present disclosure.

The following description relates to systems and methods for spark and torque control in an engine system, such as the example system of FIG. 1. An engine controller may be configured to accurately determine borderline spark settings and spark timing over a variety of engine operating conditions and ambient humidity values. The controller may perform a control routine, such as the routine of FIGS. 2-3, to learn a spark timing adjustment based on feed-forward and feedback indication of knock, and further based on a humidity-modified fuel octane assessment. By learning the octane effect of humidity with varying engine speed-load, an inferred octane can be used to improve torque control (FIGS. 4-5).

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed. The controller 12 may receive input data from the various sensors of FIG. 1, process the input data, and trigger the various actuators of FIG. 1 in response to the processed input data based on instruction or code programmed therein, and stored in the memory of the controller, corresponding to one or more routines. One example routine is shown herein with reference to FIG. 4.

During standard engine operation, engine 10 is typically operated to fire each cylinder per engine cycle. Thus, for every 720 CA (e.g., two revolutions of the crankshaft), each cylinder will be fired one time. To allow for combustion in each cylinder, each intake and exhaust valve is actuated (e.g., opened) at a specified time. Further, fuel is injected to each cylinder and the spark ignition system provides a spark to each cylinder at a specified time. Accordingly, for each cylinder, the spark ignites the fuel-air mixture to initiate combustion.

Figure 2:
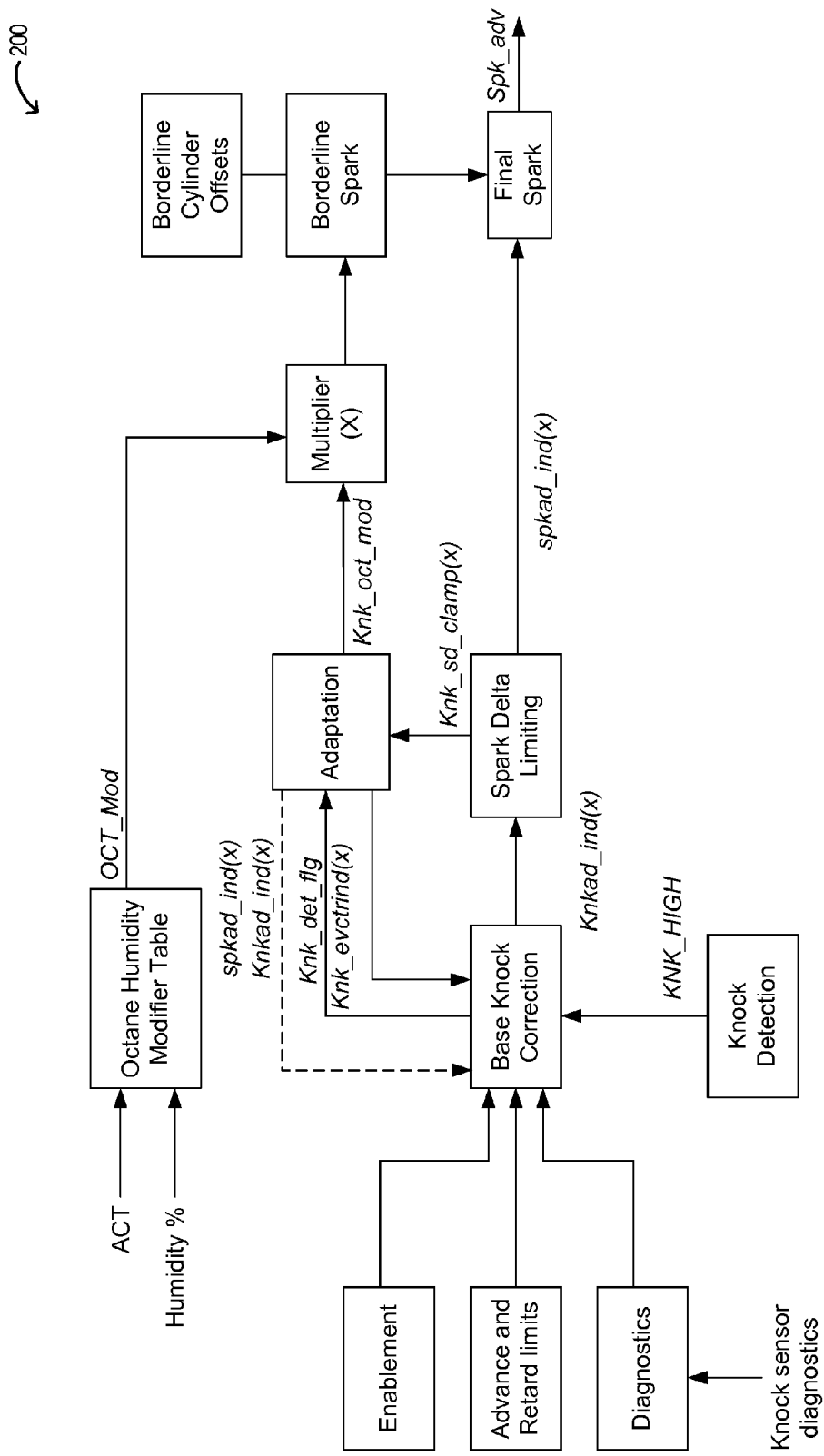
FIG. 2 shows an example block diagram of a routine for modifying fuel octane, spark timing, and borderline spark based on operating conditions including ambient humidity.

Turning now to FIG. 2, an example block diagram 200 is shown depicting a method for inferred octane estimation based on ambient humidity, and spark control using the inferred octane estimate. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

In FIG. 2, knock detection occurs using a knock sensor, along with the signal processing required to calculate the knock intensity. Based on comparing this knock intensity to a threshold, a base knock correction module advances or retards spark using knocking/not-knocking information from the detection feature. In the adaptation block, the strategy learns a global correction factor (KNK_OCT_MOD), and applies it to the borderline spark. Specifically, a continuous adaptation is processed all the time, using a PI-control loop which receives feedback from the knock sensor. This is different from prior art where the humidity information is directly fed into a speed-load curve that outputs the borderline spark, without benefiting from both the adaptation feature and the humidity measurement features simultaneously. In other words, this invention benefits from knock sensor, humidity sensor, and adaptation algorithm for an optimum borderline spark calculation, whereas prior art do not benefit from the combined capabilities of humidity measurement and knock adaptation.

Specifically, based on knock detection (such as based on the output of a knock sensor), a knock detection flag (KNK_HIGH) may be set. This knock detection data is input to a base knock correction module. The base knock correction module also receives input regarding knock sensor diagnostics, advance and retard limits, as well as enablement. The base knock correction module uses all the inputs to output an intermediate knock control spark adder (Knkad_ind(x)) that is applied before spark delta limits are applied. The spark delta limits are then applied to a final spark value (determined as discussed below) to provide a final spark advance per cylinder (Spk_adv).

The base knock correction module also provides inputs that are used to learn a knock adaptation, the inputs including an arbitrated knock detection flag (Knk_det_flg) and a knock event count per cylinder (knk_evctrind(x)). The adaptation module also receives a cylinder clamp activation input (Knk_sd_clamp(x)) from the spark delta limiting module. Using the inputs, the adaptation module determines a knock octane modifier (Knk_oct_mod) which is a global correction factor that is applied to borderline spark. The adaptation module also provides a final knock control spark adder output feature (spkad_ind(x)) to the base knock correction module as well as the intermediate knock control spark adder (Knkad_ind(x), which is also applied to the spark delta limits).

An octane humidity modifier table generates an initial octane modifier value (OCT_mod) based on aircharge temperature (ACT) and ambient humidity (humidity %). This initial octane modifier value is then modified (via a multiplier (X)) with the learned adaptation Knk_oct_mod, and applied to borderline spark. Positive values of Knk_oct_mod result in retarding of borderline spark values while negative values of Knk_oct_mod result in advancing of borderline spark values. The octane modified borderline spark value and the learned spark delta limits are then applied to determine the final spark advance per cylinder.

For example, assume that at 8 g/Kg absolute humidity (which is the calibration conditions of the engine), the borderline (BDL) spark for an operating point (e.g. of 1500 RPM, and 8 bar) is 10 degrees BTDC. At a higher humidity level (such as 15 g/Kg), the BDL would be advanced to 12 BTDC. Now if the load is abruptly increased to 1500 RPM, and 13 bar, the BDL spark should be retarded to 5 BTDC. Without input from a humidity sensor, the adaptation strategy may have to learn the spark adjustment slowly, through the feedback loop, and change spark from 12 to 5 degrees BTDC. If a humidity sensor feedback is provided, the feedforward correction due to humidity measurement would put the spark at 8 BTDC, and hence the feedback loop is only responsible for correcting between 8 and 5 BTDC, instead of going from 12 to 5. Turning now to FIG. 3, an example routine 300 is shown for learning a fuel octane modifier based on engine operating conditions including ambient humidity, and for modifying spark control, including borderline spark settings and spark timing adjustments, based on the inferred fuel octane.

At 302, the method includes estimating and/or measuring various engine operating conditions. These include, for example, the rotational speed of the engine, temperature, pressure, and volume of air charge entering the engine intake manifold, engine load, combustion air/fuel ratio, engine coolant temperature, ambient conditions including ambient temperature, barometric pressure, and ambient humidity level.

As such, the ambient humidity may vary significantly from one region to another. For example, in North America, the lowest humidity may be experienced in the Southwest at a reading of approximately 10 grains (or 10 pounds of $H_2O$ per pound of dry air). In contrast, an average humidity reading in the Midwest may be approximately 90 grains. Humidity has an effect of fuel octane. However, the octane effect of humidity varies with engine speed and load. As elaborated herein, by using an inferred octane strategy that determines the octane of the fuel based on the fuel and further based on the engine speed-load dependent effect of humidity on the octane, inferred octane may be calculated more accurately, thereby improving spark and torque control.

At 304, the method includes retrieving the most recent fuel octane estimate. In one example, the fuel octane may have been estimated following a most recent fuel tank refill event. In another example, during a last iteration of the routine of FIG. 3, a fuel octane may have been estimated and stored in the controller's memory.

At 305, the method includes determining an octane modifier based on ambient temperature and humidity. The octane modifier may include one or more of a multiplier, adder, or alternate function. By allowing for a more accurate initial condition of the adaptation and octane learning, a faster operation may be provided.

At 306, the method includes determining an initial spark timing estimate based on the estimated engine operating conditions, the fuel octane estimate, and a feedforward indication of knock. For example, the initial spark timing estimate may be based on engine speed-load conditions, likelihood of knock at those speed-load conditions, ambient humidity, scheduled EGR, etc.

At 308, the method includes learning a spark timing adjustment based on feedback indication of knock. The feedback indication of knock may be based on the output of one or more knock sensors, in-cylinder pressure sensors, ionization sensors, etc. In one example, adjusting the initial spark timing based on the feedback indication of knock includes retarding the initial timing as the feedback indication of knock increases.

At 310, the method includes learning a spark adaptation based on the initial spark timing relative to the knock-adjusted spark timing. The adaptation may include, for example, retarding spark if the knock intensity is higher than a threshold. This adaptation may be applied to individual cylinders separately or on a global scale for all cylinders. At 314, the learned spark adaptation is modified with the octane modifier to reduce the speed-load dependent effect of humidity on fuel octane.

At 316, the method includes updating the fuel octane estimate based on the octane modifier. At 318, the method includes adjusting each of borderline spark settings, and final spark timing based on the updated fuel octane estimate and the adjusted spark adaptation.

In one example, by adjusting for the humidity changes, borderline spark may be advanced by 2 degrees, resulting in an increase of 1-2 percent of the engine efficiency, since the spark will be closer to the MBT (max brake torque) spark value.

FIGS. 4 and 5 show maps depicting the example effect of the octane modification of the engine's spark adaptation. Map 400 of FIG. 4 represents a plot of the effect of humidity on borderline spark advance. As shown, borderline spark advance of an engine is increased as ambient humidity increases. For example, at 55 grains per pound, the borderline spark advance is 0, where this is the calibration condition of the engine. With an increase in humidity level, the BDL spark advances, which results in BDL spark limit getting closer to MBT and essentially improving fuel economy. Map 500 of FIG. 5 represents a plot of the effect of temperature and humidity on the fuel octane requirement of an engine. The plots demonstrates parallel lines of constant fuel octane requirement (ONR), where the base ONR of a certain fuel type is denoted by X. For a certain fuel with X as its base ONR, increasing the ambient temperature (e.g., from 20° C. to 30° C.) while keeping the humidity constant results in an increase in the octane number requirement (due to the need for a higher octane fuel to prevent knock). However, raising the ambient humidity level may cool the intake air charge and thereby reduce or at least maintain the ONR at X. FIG. 5 shows how a combination of ambient temperature and humidity measurement results in determination of the octane requirement of the fuel/intake air immediately (by referring to a look-up table stored in the engine controller's memory) which results in a faster and more robust system than identifying X and (delta-ONR) via a knock control loop alone.

In this way, spark and engine output torque control can be improved even as ambient humidity changes. By enabling the octane effect of humidity to be rendered engine speed-load independent, spark timing errors resulting from changes in humidity can be reduced. By improving the calculation of borderline spark values, and spark timings, torque errors and knock incidence can also be reduced. Overall, engine performance can be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   determining an octane modifier based on air charge temperature and ambient humidity;
   selecting an initial spark timing based on engine operating parameters including estimated fuel octane;
   learning a spark timing adjustment based on feedback indication of knock;
   correcting the spark timing adjustment based on the engine operating parameters and the octane modifier;
   updating the initial spark timing based on the corrected spark timing adjustment; and
   updating the estimated fuel octane based on a difference between the updated spark timing and the initial spark timing.

2. The method of claim 1, wherein the selecting is performed during a first iteration, the method further comprising, during a subsequent iteration, selecting a second initial spark timing based on the updated fuel octane estimate.

3. The method of claim 1, wherein the engine operating parameters include one or more of an engine speed and load, EGR, and an ambient humidity.

4. The method of claim 1, wherein the selecting includes selecting the initial spark timing based on a first relationship with the engine operating parameters, and wherein the correcting includes correcting the spark timing adjustment based on a second relationship with the engine operating parameters, the second relationship different from the first relationship.

5. The method of claim 1, wherein the selecting an initial spark timing based on engine operating parameters is performed at a first rate, and wherein the correcting the spark timing adjustment based on the engine operating parameters is performed at a second rate, the second rate slower than the first rate.

6. The method of claim 1, further comprising adjusting one or more of the engine operating parameters based on the updated fuel octane estimate.

7. The method of claim 6, wherein the one or more engine operating parameters include a fuel injection amount and a boost pressure.

8. The method of claim 1, wherein correcting the spark timing adjustment based on the engine operating parameters includes learning a correction factor as a function of at least one of humidity and EGR.

9. A method for an engine, comprising:
   generating each of a base spark timing and a borderline spark value based on engine operating parameters including engine speed, load, EGR, and humidity, and further based on an initial fuel octane estimate;
   adjusting the base spark timing and the borderline spark value responsive to detecting knock and based on an intensity of the detected knock;
   further adjusting the base spark timing and the borderline spark value with a correction factor determined based on the engine operating parameters; and
   updating the initial fuel octane estimate based on the adjusted base spark timing.

10. The method of claim 9, wherein the knock is detected based on output from one or more of an in-cylinder pressure sensor, a knock sensor, and an ionization sensor.

11. The method of claim 9, wherein adjusting the base spark timing and the borderline spark value responsive to detecting knock and based on an intensity of the detected knock includes retarding spark timing from the base spark timing, and advancing the borderline spark value towards MBT.

12. The method of claim 9, further comprising, during a subsequent iteration, generating the base spark timing based on the updated fuel octane estimate.

13. The method of claim 9, wherein the correction factor is learned as a function of at least one of ambient humidity and EGR.

14. The method of claim 13, wherein the correction factor is decreased as the ambient humidity increases.

15. The method of claim 9, further comprising adjusting one or more engine operating parameters including fuel injection amount and EGR based on the updated fuel octane estimate.

16. A vehicle system, comprising:
an engine;
a turbocharger for providing a boosted charge to the engine;
a humidity sensor for estimating an ambient humidity;
a knock sensor for indicating engine knock;
a fuel injector for delivering fuel into an engine cylinder; and
a controller with computer-readable instructions stored on non-transitory memory for:
in response to a torque demand,
generating an initial combustion profile including an initial fuel injection amount and an initial spark timing based on each of an engine speed-load, an ambient humidity, an octane rating of the fuel, and a feed-forward indication of knock;
correcting the initial spark timing with an adjustment based on a knock history of the engine and an indication of engine knock received from the knock sensor;
learning an adaptation based on a difference between the initial spark timing and the corrected spark timing adjustment, the adaptation learned continuously using a proportional-integral control loop that receives feedback from the knock sensor;
modifying the adaptation based on ambient humidity as measured by the humidity sensor;
updating the octane rating of the fuel based on the modified adaptation; and
adjusting the initial combustion profile based on the updated fuel octane rating.

17. The system of claim 16, wherein modifying the adaptation based on ambient humidity includes modifying with a modifier based on ambient humidity, the modifier including an adder and/or a multiplier.

18. The system of claim 17, wherein the controller includes further instructions for learning the modifier as a function of ambient humidity, the modifier decreased as the ambient humidity increases.

19. The system of claim 16, wherein adjusting the initial combustion profile includes adjusting each of the initial fuel injection amount and the initial spark timing, and further adjusting a borderline spark setting.

* * * * *